Figure 1:
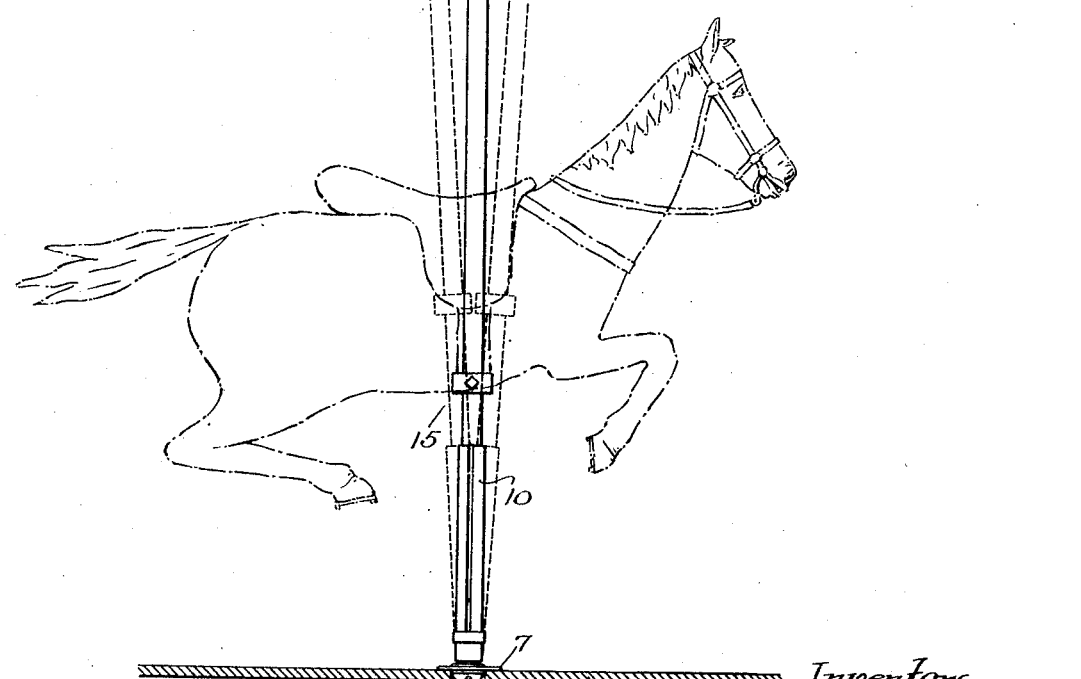

R. & J. LUSSE.
ANIMAL MOUNT OR SUPPORT FOR CAROUSELS.
APPLICATION FILED JAN. 3, 1914.

1,112,305.

Patented Sept. 29, 1914.
2 SHEETS—SHEET 1.

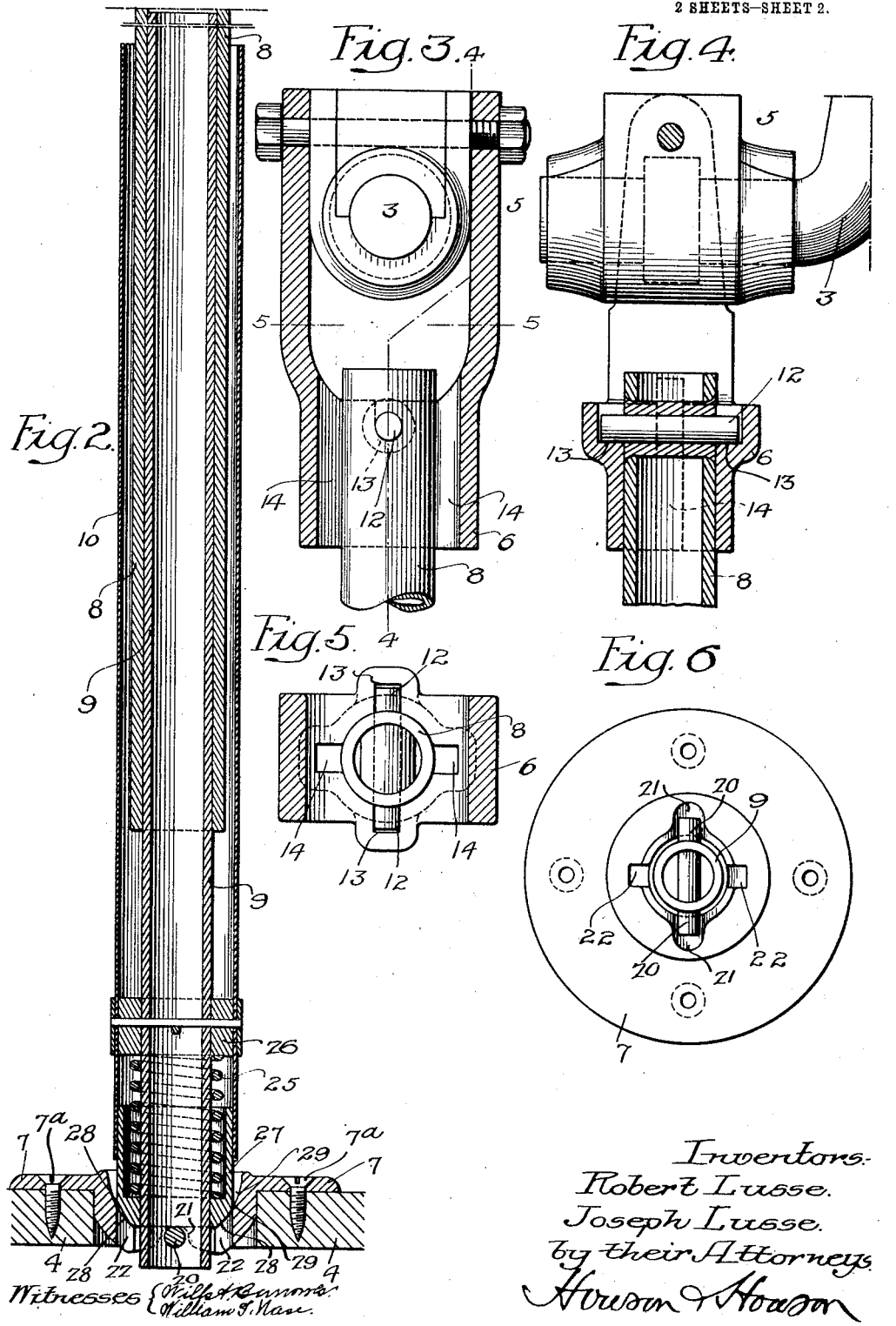

UNITED STATES PATENT OFFICE.

ROBERT LUSSE AND JOSEPH LUSSE, OF PHILADELPHIA, PENNSYLVANIA.

ANIMAL MOUNT OR SUPPORT FOR CAROUSELS.

1,112,305.       Specification of Letters Patent.      Patented Sept. 29, 1914.

Application filed January 3, 1914. Serial No. 810,153.

*To all whom it may concern:*

Be it known that we, ROBERT LUSSE and JOSEPH LUSSE, citizens of the United States, and residents of Philadelphia, Pennsylvania, have invented certain Improvements in Animal Mounts or Supports for Carousels, of which the following is a specification.

The object of our invention is to provide an animal support for carousels that will be at once simple, reliable and easily operated.

The device is more particularly applicable for use with knock-down structures inasmuch as its character is such as to greatly facilitate the dismantling of the carousel when moving from point to point, and at the same time it is most easily set up.

These and other features of our invention are more fully described hereinafter, reference being had to the accompanying drawings, in which:

Figure 1, is a view in elevation of our improved animal support shown as connected between one of the crank shafts and the floor of the carousel; the animal being indicated by dotted lines; Fig. 2, is an enlarged view of the lower portion of the support and its connection with the floor of the carousel; Fig. 3, is an elevation, partly in section, of the upper portion of the support and a suspended bracket or socket by which it is connected with a crank shaft; Fig. 4, is a sectional view on the line 4—4, Fig. 3; Fig. 5, is a sectional plan view on the line 5—5, Fig. 3, and Fig. 6, is an inverted plan view of the socket connection shown in Fig. 2.

In the drawings, 1 represents a portion of the upper framing of a carousel, carrying a bearing 2 of the usual type for a crank shaft 3, while 4 represents the floor of the carousel. The crank shaft carries at its outer end a box 5, forming a bearing, from which a socket or bracket 6 depends, and the floor of the carousel carries a socket plate 7 which may be secured in place by any suitable means, screws 7ª for instance. Between the suspended socket and the socket plate the mounts for the animals are placed, and these mounts comprise upper and lower telescoping tubular rods 8 and 9, which may slide with relation to each other as the crank shaft is turned. At the lower portion of the rods, below the animal, an enlarged tube 10 incloses the lower ends of the rods and forms a dress guard to prevent the clothing of the users coming in contact with the oily surface of the rods, since it is necessary to keep the sliding portions of the same properly lubricated.

The upper end of the rod 8 carries oppositely projecting ears or lugs 12 which may be formed by a pin passed through the bar, and such lugs are adapted to seats 13 formed in said socket. This socket is provided with grooves 14 at right angles to the seats, and when the parts are to be attached, the end of the rod is passed up through the socket with the lugs in the grooves, and then, when clear of said grooves, turned so as to permit said lugs to drop in the seats, and the weight of the rod will hold it against accidental removal. This rod is preferably provided with a suitable support 15, for the animal. The rod 8 slides over the lower rod 9 of the support, and the latter rod is provided at its lower end with lugs 20, formed by a pin passing through the rod, for engagement with seats 21 on the underside of the socket plate. Like the upper depending socket, the socket plate is provided with grooves 22 permitting passage of the lugs below the plate after the rod is introduced into the central opening of the same, and then the rod is turned so as to permit the lugs to engage the seats. To hold the lugs to their seats, a spring 25 is provided, and this spring is interposed between a collar 26 carried by the rod 9 and a cup 27 surrounding said rod and retained in place by the pin forming the lugs 20; which cup may have a rounded lower surface 28 to engage a rounded seat 29 in the socket. The spring serves to hold the cup to its seat and prevent accidental turning or dislodgment of the lugs carried by the rod from their seats.

The engagement of the lower end of the cup 27 with the socket provides practically a ball and socket joint, readily permitting such lateral movement of the telescoping supporting rod as will be occasioned by the throw of the crank. If desired, a spring may be provided in the upper depending socket 6 to hold the lugs 12 to their seats, although this is not essential.

It will be readily understood that with this construction there is no necessity of dismantling the bearing box 5 receiving the end of the crank shaft, and hence the assembly of a carousel structure with animal supports or mounts made in accordance with our invention is quite simple and most expeditiously effected, while dismantling of the same is also readily and quickly accomplished.

In assembly, the two telescoping rods 8 and 9 are slipped together with the animal in proper position; then the upper rod has its upper end properly connected with the depending socket 6 in the manner described, and then the end of the lower rod is forced into the opening of the floor socket against the action of the spring and connected in the manner indicated, or, if desired, the lower connection may be made first.

While the invention has been described as particularly applicable to carousel construction, it will be understood that it is equally applicable to other structures in which removable struts or bars of a sectional character are employed, and hence there is no desire that the claims be limited to carousels.

We claim:

1. The combination of a longitudinally extensible rod carrying a spring at the bottom, a socket for the lower end of the rod, means locking the rod thereto and held in place by said spring, and a movable connection for the upper end of said rod.

2. The combination of a longitudinally extensible rod, lugs at each end of said rod, a socket for the lower end of the rod having means for engaging the lugs to lock the rod thereto, and a movable connection for the upper end of said rod engaging the lugs of the same.

3. The combination of a pair of telescoping rods one of which is longitudinally movable with respect to the other, a movable connection for the upper rod, a spring carried at the bottom of the lower rod, a socket receiving the lower rod, and means held in place by said spring for locking the rod to said socket.

4. The combination of a pair of telescoping rods one of which is longitudinally movable with respect to the other, lugs carried by said rods at the outer terminals of the same, a movable connection engaging the lugs at the upper end of the upper rod, a socket receiving the lower end of the lower rod and having provision for engaging the lugs of the same, and means for locking the rod thereto.

5. The combination of a supporting rod carrying a spring at the bottom, retaining means for said bottom end, a depending socket, and lugs carried by said rod, said socket having grooves for the passage of the lugs through the socket and seats for the reception of said lugs upon giving the rod a quarter turn, said spring serving to hold said lugs in their seats.

6. The combination of a supporting rod carrying a spring at the bottom, retaining means for said bottom end, a crank-shaft, a depending socket carried by said crank-shaft, and lugs carried by said rod, said socket having grooves for the passage of the lugs through the socket and seats for the reception of said lugs upon giving the rod a quarter turn, said spring serving to hold said lugs in their seats.

7. The combination of a supporting rod carrying a spring at the bottom, a depending socket, lugs carried by said rod, said socket having grooves for the passage of the lugs through the socket and seats for the reception of said lugs upon giving the rod a quarter turn, and a connection for the lower end of said rod, said spring serving to hold said lugs in their seats.

8. The combination of a supporting rod carrying a spring at the bottom, a crank-shaft, a depending socket carried by said crank-shaft, lugs carried by said rod, said socket having grooves for the passage of the lugs through the socket and seats for the reception of said lugs upon giving the rod a quarter turn, and a yielding connection for the lower end of said rod, said spring serving to hold said lugs in their seats.

9. The combination of a rod carrying a spring at the bottom, a socket, a plurality of seats carried by said socket, the latter having grooves at right angles to said seats, and lugs carried by the rod and adapted to be inserted in said socket and turned for engagement with the seats, said spring serving to hold the lugs to their seats.

10. The combination of a rod, a socket, a plurality of seats carried by said socket, the latter having grooves at right angles to said seats, lugs carried by the rod and adapted to be inserted in said socket and turned for engagement with the seats, and a spring-actuated member for engagement with one side of the socket whereby the lugs may be held to their seats.

11. The combination of a pair of telescoping rods, sockets, seats carried by said sockets, lugs carried by each of the rods for engagement with said socket seats, and a spring-actuated member for engagement with one of the sockets whereby the lugs engaging the same will be held to their seats.

12. The combination of a pair of telescoping rods, sockets, seats carried by said sockets, the latter having grooves at right angles to said seats, lugs carried by each of the rods and adapted to be inserted in said socket and turned for engagement with the seats, and a spring-actuated member for engagement with one of the sockets whereby the lugs engaging the same will be held to their seats.

13. In a carousel, the combination of a pair of upper and lower telescoping rods, a suspended socket for the upper end of one of said rods, a crank-shaft carrying said socket, said socket having seats, said upper rod having lugs arranged to rest in the seats, a lower socket plate carried by the floor of the carousel and having seats, lugs carried by the lower rod adapted to said seats, and a spring-actuated member for engagement with the socket for retaining said latter lugs to their seats.

14. In a carousel, the combination of a pair of upper and lower telescoping rods, a suspended socket for the upper end of one of said rods, a crank shaft carrying said socket, said socket having grooves and seats at right angles to the grooves, said upper rod having lugs arranged to enter the socket via the grooves and be turned to rest in the seats, a lower socket plate carried by the floor of the carousel and having grooves and seats at right angles to said grooves, lugs carried by the lower rod adapted to said seats, and a spring-actuated member for engagement with the socket for retaining said latter lugs to their seats.

15. In a carousel having a floor and a crank-shaft, the combination of an animal supporting rod, a depending socket carried by the crank-shaft, lugs carried by the upper end of said rod, said socket having grooves for the passage of the lugs through the socket and seats for the reception of said lugs upon giving the rod a quarter turn, and a connection for the lower end of the rod carried by the floor.

16. In a carousel having a floor and a crank-shaft, the combination of a supporting rod, a depending socket carried by said crank-shaft, lugs carried by both ends of said rod, said depending socket having grooves for the passage of the lugs through the socket and seats for the reception of said lugs upon giving the rod a quarter turn, and a socket carried by the floor in which the lugs carried by the lower end of the rod are seated.

17. In a carousel having a floor and an overhead crank-shaft, the combination of a pair of upper and lower telescoping rods forming an animal support, a suspended socket for the upper end of said support, a bearing carried by said socket, said crank-shaft being adapted to said bearing and said socket having seats, lugs carried by the upper end of said support and arranged to rest in said seats, a socket plate carried by the floor of the carousel and having seats, lugs carried by the lower end of said support and adapted to said seats, and a spring-actuated member for engagement with the socket for retaining said latter lugs to their seats.

18. In a carousel having a floor and an overhead crank-shaft, the combination of a pair of upper and lower telescoping rods forming an animal support, a suspended socket for the upper end of said support, a bearing carried by said socket, said crank-shaft being adapted to said bearing and said socket having grooves and seats at right angles to the grooves, lugs carried by the upper end of said support and arranged to enter the socket via the grooves and be turned to rest in the seats, a socket plate carried by the floor of the carousel and having grooves and seats at right angles to said grooves, lugs carried by the lower end of said support and adapted to said seats after passage through said grooves, and a spring-actuated member for engagement with the socket for retaining said latter lugs to their seats.

19. In a carousel, a bearing rod carrying a spring at the bottom, a pin projecting from opposite sides at the bottom, and a base piece to receive the rod and having alternating cuts to permit the passage of the pins and recesses to receive and hold the pins.

20. In a carousel, a spring pressed bearing rod, a metal base piece having a central opening to receive the rod, pins on the rod, cuts in the base piece to permit the passage of the pins, and recesses in the base piece to receive the pins.

In testimony whereof, we have signed our names to this specification, in the presence of two subscribing witnesses.

ROBERT LUSSE.
JOSEPH LUSSE.

Witnesses:
FRED E. SCHMIDT,
ROSCOE C. SCHMIDT.

---

Copies of this patent may be obtained for five cents each, by addressing the "Commissioner of Patents, Washington, D. C."